United States Patent [19]
Alei et al.

[11] Patent Number: 4,600,631
[45] Date of Patent: Jul. 15, 1986

[54] ULTRA TOUGH PLASTIC MATERIAL

[75] Inventors: Philip E. Alei, Clute, Tex.; Nam P. Suh, Sudbury, Mass.

[73] Assignee: Massachusetts Institute of Technology, Cambridge, Mass.

[21] Appl. No.: 605,916

[22] Filed: May 1, 1984

[51] Int. Cl.$^4$ .......................... D04H 1/58; D04H 1/04
[52] U.S. Cl. ..................................... 428/212; 428/288; 428/296; 428/420; 428/910; 264/171
[58] Field of Search ............... 428/288, 212, 296, 910, 428/420

[56] References Cited

U.S. PATENT DOCUMENTS

| | | | |
|---|---|---|---|
| 3,900,640 | 8/1975 | Vecchiotti | 428/420 X |
| 4,442,147 | 4/1984 | Schrimer | 428/910 X |
| 4,443,513 | 4/1984 | Meitner et al. | 428/910 X |
| 4,489,133 | 12/1984 | Kornberg | 428/420 X |

Primary Examiner—P. C. Ives
Attorney, Agent, or Firm—Robert F. O'Connell

[57] ABSTRACT

A novel and improved ultra tough polymer plastic material wherein a first polymer portion of the material has substantially non-oriented molecules forming a matrix within which there is a second polymer portion of the material having substantially oriented molecules, the first and second portions forming substantially continuous interface regions therebetween in which the first and second portions are highly diffused with each other. In a particular novel process for forming such material, one or more fibers of the material are formed and the molecules thereof are selectively oriented, the fibers are then processed to increase the thermal stability of the selectively oriented molecules so as to maintain the selected orientation thereof and a selected arrangement of the processed fibers are molded at a selected temperature and pressure, the pressure being maintained throughout the heating and cooling step of the molding process to prevent any change in the selective orientation of the molecules. The molded part then has high stength and a high degree of toughness.

13 Claims, 14 Drawing Figures

C = CARBON
• = HYDROGEN
— = COVALENT BOND
  (≅ 100 KCAL / MOLE)
~~ = VAN DER WAALS BOND
  (≅ 1-2 KCAL / MOLE)

ULTRA TOUGH PLASTIC MATERIAL

This invention relates to plastic materials and, more particularly, to a unique improved ultra tough plastic material and the process for making the same.

BACKGROUND OF THE INVENTION

Much research has been done to increase the toughness and strength of polymeric materials and today such polymeric plastics are used in many demanding engineering applications. In order to increase the number of applications where such plastics can be effectively used, it is desirable that they have high impact toughness and/or be capable of use in very low temperature applications, e.g., at cryogenic temperatures where metals and ceramics are now used almost exclusively. Such plastic materials should also have good thermal insulating characteristics, be chemically stable, light weight, and fracture resistant.

One application in which their high strength-to-weight ratios make plastics a good, relatively low cost alternative to metal is in the use, for example, of certain automobile parts such as bumpers and fenders which require high impact toughness. In addition such parts as gasoline tanks are particularly well suited for using ultra tough plastic materials, particularly polyethylene materials which are chemically resistant to gasoline.

Another effective application for tougher plastic materials is in the fabrication of seamless belts where the lack of seams avoids the normal weakness that occurs with seamed belts. The use of an improved ultra tough plastic material would provide a strong but flexible seamless belt.

Further, in the computer industry, for example, many memory modules must operate at very low temperatures at which conventional printed circuit board materials become very brittle and subject to fracture and thus unsuitable for such purpose. The fabrication of low temperature, ultra tough plastic materials could have a large impact in such industry if the materials can be made much less brittle at the cryogenic temperatures involved.

In some applications an ultra tough plastic material may be substituted for aluminum, particularly where a high strength-to-weight ratio is important. In such applications it would be desirable that the tensile strengths of such materials be comparable to aluminum even though the densities thereof are much lower.

DESCRIPTION OF THE PRIOR ART

The formation of stronger materials has been investigated over the years one approach to which has been to generally orient the molecular chains of a polymer material along a selected direction in order to affect its mechanical behavior. Thus, tensile drawing techniques have been used to strengthen extruded fibers by molecularly orienting the fibers along the axis of draw. For example, work done on some polyethylene materials has indicated that very high draw ratios (up to 25-30) provide significant increases in the modulus of the materials which are accompanied by increases in tensile strength and thermal conductivity.

Others have studied the solid state extrusion of such material through a conical die as a technique for introducing a high degree of molecular orientation. Still others have suggested the use of hydrostatic extrusion techniques for improving the tensile strength of materials.

Still others have suggested a combination of tensile drawing and extrusion techniques, sometimes referred to as "push-pull extrusion".

Another proposed method to improve the mechanical properties of polymeric materials has been to form such materials by axially orienting sheets which are produced using hydrostatic extrusion via special dies. Such materials have been found to have improved mechanical properties in two directions.

The major limitation of such generally cold working processes is that the shape of the final part which may be formed from such material is extremely limited. The polymer material is substantially highly deformed during the stretching or extrusion process and any lateral dimension (i.e., other than along the direction of stretching or extrusion) will not be maintained. Any such material which may be used in the molding of parts into arbitrary desired shapes requires heating such polymers to conventional processing temperatures, and at such temperatures the molecular orientation which has been achieved by the cold working technique is lost. Accordingly, the mechanical properties of the final part are no longer enhanced in terms of its tensile strength, modulus, or impact resistance. Furthermore, there are no known techniques for imparting toughness at cryogenic temperatures.

It is desirable to develop a technique which produces materials which maintain high strength and high modulus characteristics in a molded part that may have an arbitrary geometry.

BRIEF SUMMARY OF THE INVENTION

In accordance with the invention a novel and improved ultra tough plastic material is now available. The material comprises a first portion thereof having substantially non-oriented molecules forming a matrix within which there is a second portion thereof having substantially oriented molecules, the first and second portions forming substantially continuous interface regions in which the first and second portions are highly diffused with each other. Such material can be made by using a novel process in which a plurality of fibers of the material are formed and each of the fibers is stretched along a selected direction so as to orient the molecular chains thereof generally along such direction. The elongated or stretched fibers are then processed to increase their thermal stability so that the material which is a thermoplastic material after the stretching process becomes partially a thermoset material so that its thermal stability is maintained on a substantially permanent basis. One technique for increasing thermal stability and maintaining such orientation, for example, is to irradiate the elongated fibers with appropriate radiation, such as electron beam radiation, in order to partially cross-link the molecular chains in the material.

Once thermal stability has been so achieved, as by a cross-linking process, for example, the material is then molded using a compression molding technique wherein the pressure is selected to provide a mechanical force which holds the selected arrangement of fibers within the mold in a manner such as to prevent any contraction or shrinkage thereof, the temperature of the compression molding process being selected to be sufficient to provide a fusing, or sintering, of the fibers so as to bond them together without affecting the molecular orientation which was previously achieved.

DESCRIPTION OF THE INVENTION

The invention can be described in more detail with the help of the accompanying drawings wherein FIG. 1 shows an exemplary structure of a linear polyethylene material;

Figure 1:
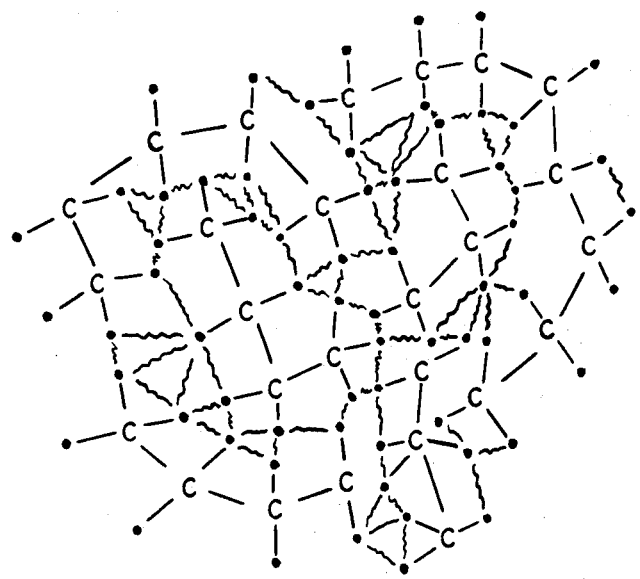

The molecular structure of polymers is such that the strength and modulus (i.e.,Young's modulus) can be increased by aligning the molecules in a specific direction. A polyethylene material, for example, which is a relatively simple polymer consisting of carbon and hydrogen atoms formed in molecular chains, is an example of such a polymer. FIG. 1 shows the structure of a linear polyethylene material depicting the general relationship between the carbon and hydrogen atoms thereof and the covalent and Van der Waals bonds therebetween as is well known to the art.

When a randomly oriented polymer of this nature is subjected to a tensile load the bulk material strength is very weak and may of the weak Van der Waals bonds are broken although relatively few of the covalent bonds would be so broken. Because of such a molecular arrangement such plastics are generally much weaker than metallic or ceramic materials despite the relatively strong covalent bonds within the material, since the molecules are not arranged in a configuration which gives bulk strength.

Figure 2:
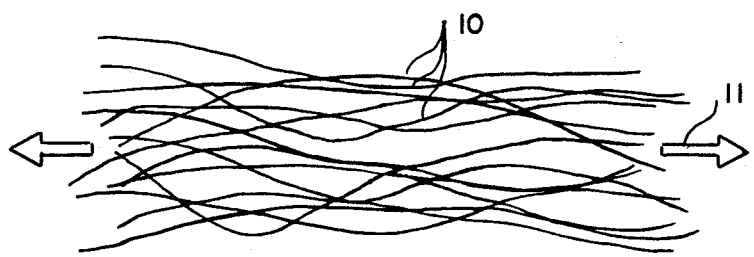
FIGS. 2 and 2A show in diagrammatic form exemplary structures of oriented polymer chains and randomly oriented polymer chains in such a material.
Figure 2A:
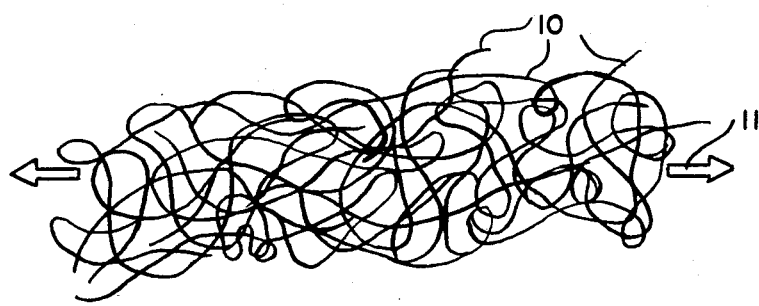

If many of the polyethylene molecules are aligned in a specific direction, the strength can be greatly increased in that direction and, accordingly, the mechanical properties of a part which is made thereof can be improved. Such oriented polymer chains 10 are shown diagrammatically, for example, in FIG. 2 and tend to more readily support a tensile load (shown by the arrows 11) than a polymer having a random orientation of its molecular chains. Such oriented chains can be contrasted with chains having a random orientation as shown in FIG. 2A.

Unfortunately the use of such materials in an injection molding process, for example, does not permit the maintenance of such orientation since most of the molecular alignment is lost during the heating cycle, prior to entering the mold and being cooled. Since the thermal conductivity of such polymers is very low, rapid cooling is not possible so that a part made with oriented molecules tends to return to its random state before the orientation can be locked in. Some residual orientation will increase the tensile strength over that achievable with completely randomly oriented materials but, depending on how much residual orientation remains, the overall tensile strength is usually not increased significantly. Furthermore, the direction of molecular orientation in such a material cannot be controlled with respect to the loading direction and, therefore, it may not enhance the strength and toughness of the molded parts.

In many cases orientation can be introduced by the drawing of fibers of the material in their solid state. By stretching the polyethylene to many times its orientinal length at controlled temperatures and strain rates, a relatively high degree of molecular orientation can be achieved which tends to increase the ultimate strength of high density polyethylenes, for example. So long as the material can remain in its solid state there is no tendency to relax to its non-oriented state. However, if the temperature of such material is raised, in general, about the glass transition temperature, the molecular orientation is gradually lost and the strength is no longer enhanced.

It is helpful to maintain the orientation by increasing the thermal stability of the oriented fibers and one approach thereto in accordance with the invention is to partially cross-link the molecular chains in an aligned polyethylene material. One approach to such a cross-linking process is to expose the material to high energy radiation, i.e., electron beams, X-rays, gamma rays, etc. Cross-linking processes are known using such techniques and the mechanical properties of the material, such as linear polyethylene, are not significantly affected by the radiation although the thermal properties are. By linking some of the neighboring molecules the bulk plastic can be converted from a thermoplastic polymer, which flows upon heating above its melting temperature, to a thermoset polymer, which becomes relatively soft and rubbery at high temperature but does not melt and flow.

Unfortunately when such materials are placed in a high temperature injection or extrusion mold, although the material does not melt and flow, the oriented fibers tend to contract or shrink to their non-oriented state because the molecular orientation is not maintained at the injection molding or extrusion molding processing temperature. The mechanical properties of the final part, where it is desired to form a plastic part in an arbitrary geometry, do not retain their strength enhancements. The material which results is not as strong as desired in its tensile strength characteristics and is also not as strong in its impact resistance. At relatively low temperatures, for example, at cryogenic temperatures, the material becomes extremely brittle and readily subject to fracture upon even minimal impact.

Figure 4:
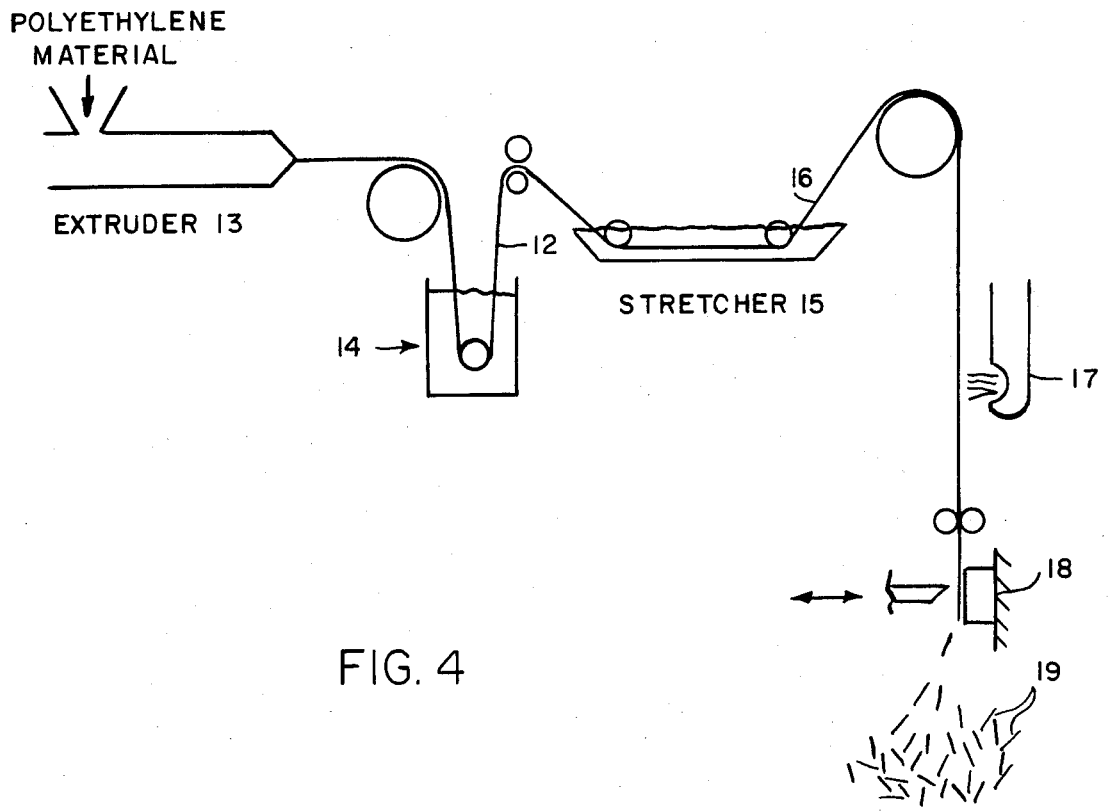
FIG. 4 shows in diagrammatic form the steps in an exemplary process for use in providing the material of the invention.
Figure 5:
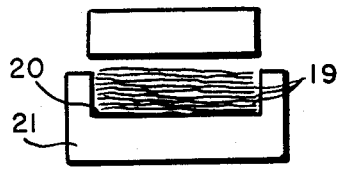
FIGS. 5, 5A, 5B and 5C show further steps in an exemplary compression molding process used for producing a molded part from a material in accordance with the invention.

FIGS. 4 and 5 show the steps of one possible process for providing a molded part fabricated using extremely tough plastic material that has exceptional mechanical properties in that the material can be highly oriented and at the same time the high degree of orientation can be maintained or "locked in" throughout the overall process.

Figure 3:
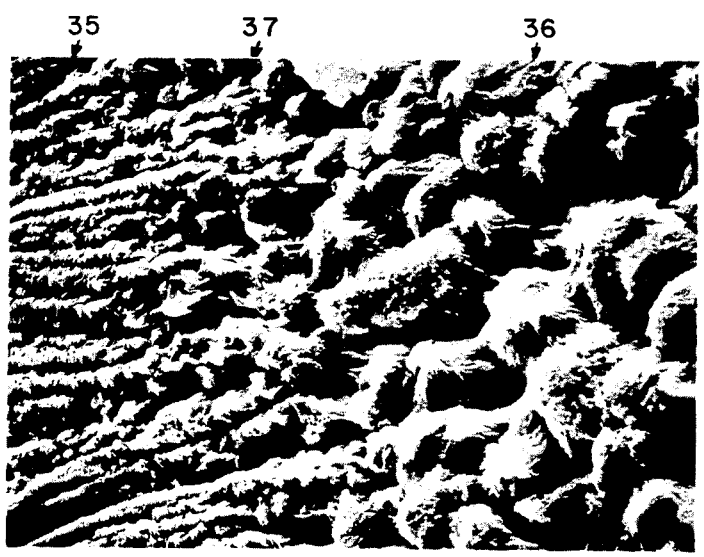
FIG. 3 is photomicrograph showing the structure of a particular material of the invention.

The material of the invention can be best described as one comprising highly oriented molecules in a matrix of its own unoriented polymer, wherein the interfacial regions between the two polymer forms exist in a highly diffused state. Such a configuration and molecular dispersion within the material result in a molded part that has a very high strength simultaneously coupled to a very high degree of toughness, which is a combination of mechanical properties that has always been desired and that is finally achieved through this material of the invention. FIG. 3 shows a photomicrograph of a portion of the structure of a high density polyethylene material of the invention which comprises a polymer portion 35 thereof having substantially oriented molecules, a polymer portion 36 thereof having substantially non-oriented molecules and highly diffused interface regions 37 therebetween. Such photomicrograph has a magnification of 1200 X.

The strength of the material is embodied within the highly oriented molecules while the toughness is brought about by the material's resistance to crack propagation in that, for example, once one of the high-modulus, oriented molecules is broken during a tensile or an impact test, the crack developed therein needs energy to sustain crack propagation which energy must be supplied by the release of elastic energy stored at the crack tip. However, since the crack propagates through the adjoining, low-modulus, unoriented material of the matrix, the energy stored is small and furthermore the energy is dissipated by the visco-plastic deformation of the oriented molecules, thus arresting the crack and imparting high toughness. Once the crack is reloaded, the developed crack will again encounter high-modulus, oriented material regions which require further energy input for any such fracture process to continue. It is believed that it is because of the material's ability not to store such large amounts of energy while allowing only minimal loss of structural integrity that makes it extremely tough and permits it to sustain large impacts even at, for example, cryogenic temperatures.

The configuration of a diffused interface also prevents the formation of cracks, usually characteristic of multi-state materials with, for example, discontinuous interfaces. Therefore, the material of the invention is unique in that the two existing states of the polymer, each of which has desireable properties, are linked by a continuous diffused interface that not only maintains structure, but in itself improves the overall combination of properties within the material states.

Though there are many methods of forming the novel material matrix described above, a particular one, for example, developed in accordance therewith, begins with the formation of fibers through a suitable extrusion process.

The solid state fibers are stretched to form much stronger fibers having a high degree of molecular orientation. Such fibers are then partially cross-linked, i.e., the molecular chains therein are partially cross-linked, in a particular embodiment, for example, by exposure to high energy radiation. The oriented, and partially cross-linked, fibers are then placed in an appropriate compression mold for forming a part which can have a particular arbitrary geometric configuration under conditions of high temperature and pressure, the pressure being maintained throughout both the molding and the cooling process. The resulting part which is formed by such compression molding technique is found to have extremely good mechanical properties, as discussed in more detail below.

Figure 5A:
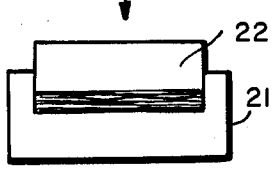

As seen in FIG. 4, a polyethylene material is extruded using an appropriate and well-known extrusion technique, the extrusion shown diagrammatically by extruder 13, the extruded material being quenched by passage through a cold water bath 14 to form a continuous fiber 12 which is then stretched by an appropriate technique such as using a stretching apparatus 15 in a bath of water, for example, at 50° C. The stretched material 16 is then irradiated by passing it one or more times under a suitable radiation source, such as an electron beam source 17, and the irradiated material is then placed in a form for use in a suitable compression mold. In the particular embodiment shown diagrammatically in FIG. 4 the material is cut by a suitable cutting instrument 18 to a desired length for use in a mold such as shown in FIG. 5. The cut fibers 19 are loaded into the cavity 20 of a mold 21 as shown in FIG. 5. Pressure is applied thereto via mold part 22 as shown in FIG. 5A and the mold is heated to a suitable temperature, e.g., 150° C., to form the particular part having the desired geometric configuration of the mold cavity 20.

Figure 5B:
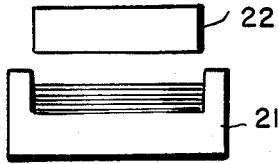
Figure 5C:
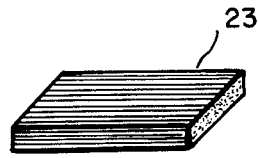

The molded material is permitted to cool while the pressure is maintained throughout the cooling process. When the material has cooled to a selected temperature the pressure is released as shown in FIG. 5B and the part 23 can be removed, as shown in FIG. 5C.

In a particular embodiment the plastic used for such purpose was a high density polyethylene resin, most commonly used in injection molding processes and sold under the trade name Alathon 7030 by E. I. du Pont de Nemours Corporation of Wilmington, Del. Such a material has relatively high toughness and narrow molecular weight distribution and can be readily and conveniently used in a cold stretching process. The polyethylene was first extruded into a continuous strand of suitable diameter, e.g., 0.050", and then quenched at room temperature in a water bath. The strand was then stretched to approximately ten times its original length, which stretching process introduced a relatively high degree of molecular alignment for orientation.

Since such high density polyethylene is relatively brittle at room temperature, the stretching process is carried out at an elevated temperature, greater than room temperature, (e.g. 50° C.) at which temperature such a polymer is relatively more ductile and less brittle than at room temperature and can be reasonably stretched without breakage.

The stretched or elongated fibers are relatively strong compared to non-oriented polyethylene materials due to the alignment of the molecules along the direction of elongation. So long as the polymer material remains solid the orientation can be maintained. If, however, the temperature of the material is raised above its melting point the molecules will relax to their preferred random state and the orientation is lost.

The next step in accordance with the invention is to increase the thermal stability of the stretched material by an appropriate technique. One such technique is to subject the stretched material to irradiation which causes a partial cross-linking of the polymer chains. Thus the material is exposed to a 15 megaradian (MRad) dose of a high energy electron beam. In a preferred embodiment, for example, the material may be passed under an election beam more than once at a relatively lower dosage so that the overall dosage will be equal to the desired 15 MRad dose. At this dosage roughly 75% of the polymer is known to crosslink. In a particular process, for example, the material was passed six times under an electron beam providing a dosage of 2.5 MRad per pass. Under such conditions some cross-links of the molecular chains therein are formed the partially cross-linked formation thereby significantly improving the thermal stability of the polymer and changing it from a thermoplastic to a thermoset polymer.

In the particular process shown in FIG. 4 the irradiated material was then cut to a desired length for further processing in an appropriate compression mold as shown in FIG. 5 wherein the cross-linked cut fibers were placed in a generally aligned direction within the mold cavity. The compression molding process was then used to form a plastic part which had a desired geometric configuration. In accordance with the invention, the pressure which is applied during the compression process must be maintained throughout both the heating process, which fuses the fibers so as to bond them together in an effective sintering process, and the cooling process thereof. The maintenance of such pressure throughout the molding process is required so as to hold the fibers in place and to pevent a relaxation of the orientation of the molecular chains therein. The pressure thereby acts as a mechanical force to prevent such fiber relaxation which occurs if the fibers are permitted to contract, or shrink, during the molding process.

The resulting part has exceptional tensile strength and outstanding fracture toughness compared to standard high density polyethylene molded parts previously available in the art. The pressure in the particular example shown in FIG. 5, for example, was maintained at 475 psi during the heating process and during the cooling process when the part was cooled from the 150° C. temperature used in the fusion process down to about 40° C. at which point the pressure was released and the part removed.

Figure 6:
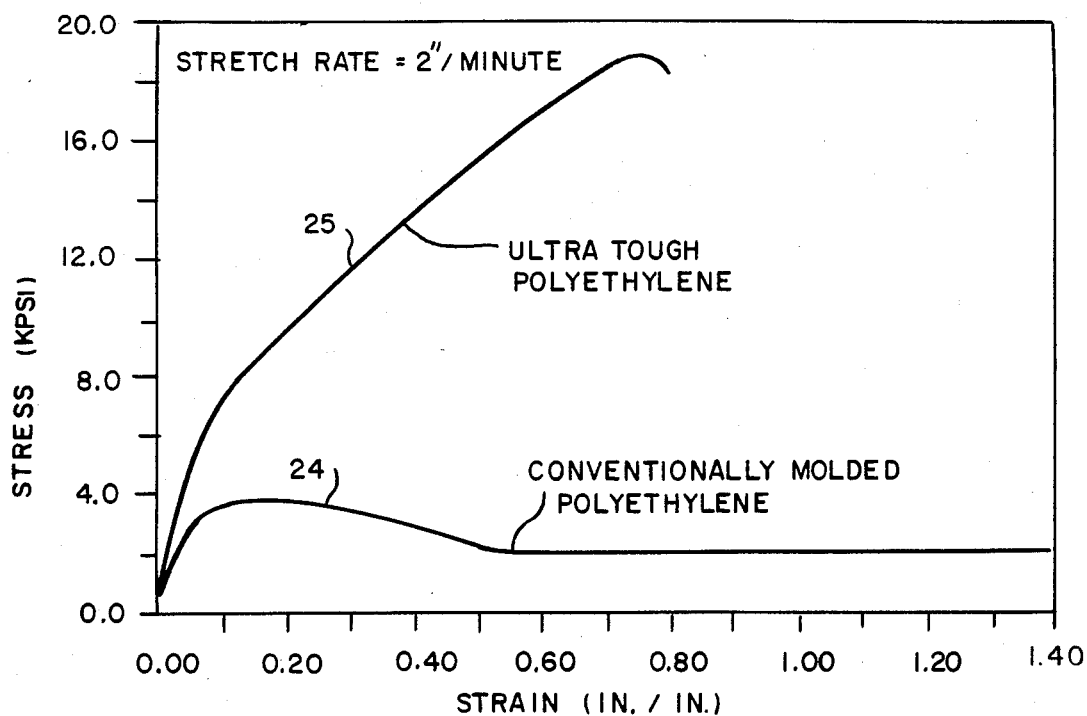
FIG. 6 shows tensile strength test data for an exemplary material made in accordance with the process of the invention.

FIG. 6 shows a graph comparing exemplary curves of the tensile strength, i.e. stress vs. strain, of molded parts made in accordance with the invention as compared with conventionally molded polyethylene parts. As can be seen by curve 24, the stress (in Kpsi) as a function of strain (in inch/inch) remains relatively constant for conventionally molded parts at a stretch rate of two inches per minute, while for ultra tough polyethylene material made in accordance with the invention at the same stretch rate, the stress becomes considerably higher as a function of strain as shown by curve 25.

Figure 7:
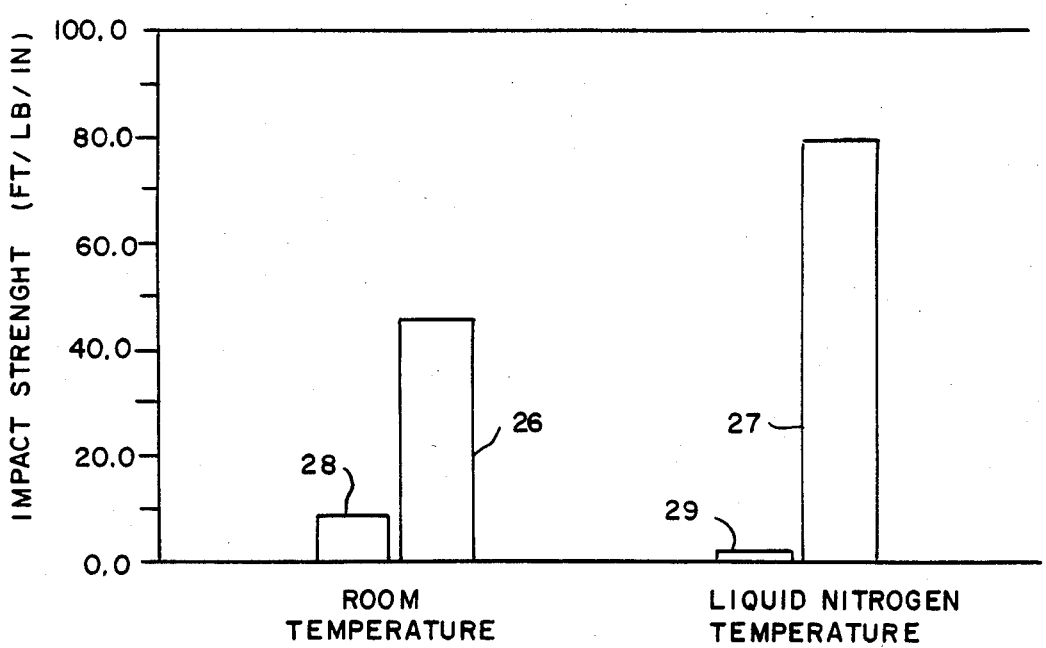
FIG. 7 shows a graph of impact test data for an exemplary material made in accordance with the invention.

With reference to the impact testing thereof, the impact strength is best shown by the bar graph of FIG. 7, wherein the comparative impact strengths (in foot-pounds per inch) are shown both at room temperature and at very low cryogenic temperatures in liquid nitrogen. As can be seen, the bar graphs 26 and 27 show the average impact strengths for ultra rough material made in accordance with the invention, while the bar graphs 28 and 29 show the much lower average impact strengths for conventionally molded linear polyethylene material.

Figure 8:
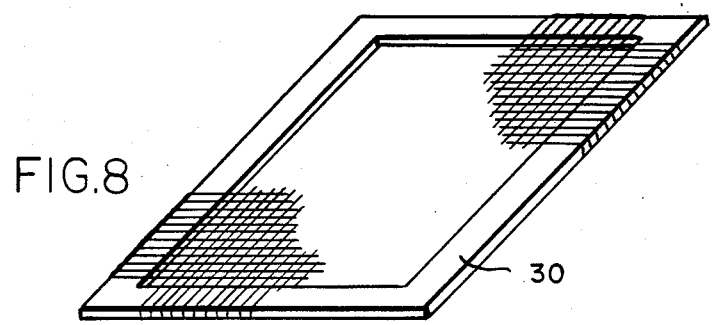
FIGS. 8, 8A and 8B show structures useful in the process of the invention for maintaining orientation during the compression molding steps thereof.
Figure 8A:
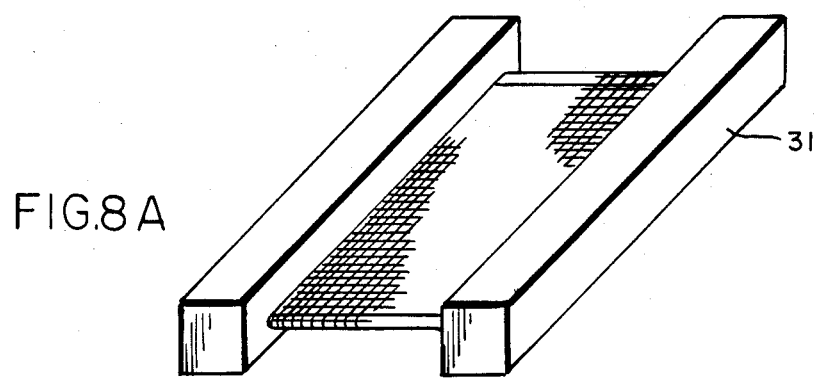

Other techniques for maintaining the orientation of the molecules during the compression molding process can be used. For example, the material can be wrapped around suitable racks, as shown in FIGS. 8 and 8A. FIG. 8 shows fibers tightly wrapped on a rack 30 in two directions to form a two dimensional configuration thereof, while FIG. 8A shows fibers tightly wrapped on a rack 31 in a single direction to form a one dimensional configuration. Such tightly wrapped fibers can then be placed in a mold under pressure and maintained at the molding pressure throughout the heating and cooling processes thereof, as discussed above. Such precision aligned fibers provide high tensile strength and impact properties in the direction of alignment, FIG. 8, for example, giving excellent characteristics in both dimensions.

Figure 8B:
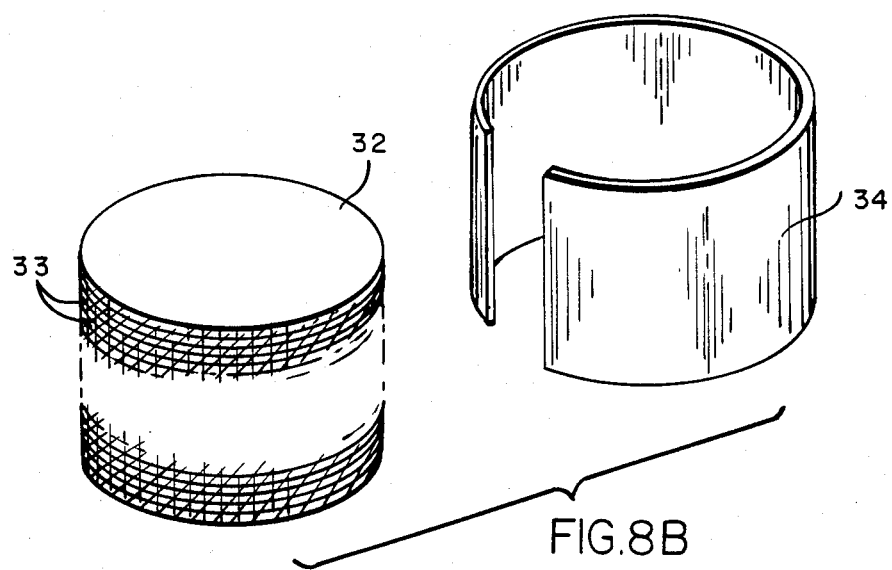

Another approach to the compression molding process is in the production of continuous belts of the material. In such case, as shown in FIG. 8B, a five inch diameter aluminum cylinder 32 in a specific embodiment has oriented fibers 33 wrapped around its curved surface as shown therein. The fibers are irradiated on the cylinder itself and then compression molded in such configuration by a suitable compression mold clamp 34 encircling the cylinder. The resulting material produces an extremely strong seamless polymer belt having use in many applications.

In the process of the invention the fibers are normally stretched within a range from about 4 times to 25 times their original length, such process being a function of the temperature of the plastic during the stretching operation and usually performed at a temperature which is adequate to assure the reasonable ductility of the material so as to prevent breakage during the stretching process.

It has been found that excessive irradiation tends to cause scission of the molecular chains and that expessive single dose irradiation may tend to cause a significant temperature rise within the material so as to melt the material or cause loss of the molecular orientation before thermal stability is attained. Such effect can be reduced by using a lower dosage and passing the material under the irradiating beam more than once, as discussed above. It is believed that in the case of high density polyethylene, for example, a maximum radiation up to about 10 MRads to about 20 MRads will provide the best results. While an electron beam has been used successfully for such purposes, it is clear that other irradiating beams such as X-rays or gamma rays and the like can also be used to achieve the partial cross-linking operation. Moreover, other techniques for producing thermal stability, as by providing such partial cross-links, other than by irradiation, may also be used.

Molding temperatures in the case of polyethylene, for example, can generally range from about 140° C. to about 200° C., with molding pressures from about 200 psi to about 1000 psi. Cooling to temperatures from about 20° C. to about 60° C., while maintaining such pressure, should give adequate results for such materials.

While specific exemplary embodiments of the techniques of the invention for producing materials thereof have been discussed above, the invention should not be limited to such specific embodiments and modifications thereto may occur to those in the art within the spirit and scope of the invention. Hence, the invention is not to be construed as limited to the specific embodiments disclosed except as defined by the appended claims.

What is claimed is:

1. A polymeric plastic material comprising
   a first polymeric plastic component forming a matrix, the molecules of first said component being substantially non-oriented molecules;
   a second polymer plastic component being distributed within the matrix formed by said first component, the molecules of said second component being substantially oriented molecules;
   said first and second polymer plastic components having interface regions therebetween in which regions said first and second components are substantially diffused with each other.

2. A polymer plastic material in accordance with claim 1 wherein said interface regions are substantially continuous and link said first and second components.

3. A polymer plastic material in accordance with claim 2 wherein said second polymer plastic component comprises a plurality of fibers the molecules of which are substantially oriented along a selected direction.

4. A polymer plastic material in accordance with claim 2 wherein the molecules of said second polymer plastic component are substantially permanently oriented so as to prevent any substantial changes in said orientation during subsequent processing of said material.

5. A polymer plastic material in accordance with claim 3 wherein the molecules of said fibers are substantially permanently oriented so as to prevent any substantial change in said orientation during subsequent processing of said material.

6. A polymer plastic material in accordance with claim 1 wherein said second polymer plastic component has a substantially higher modulus of elasticity than that of said first component.

7. A polymer plastic material in accordance with claim 2 wherein said material is a polyethylene material.

8. A polymer plastic material in accordance with claim 7 wherein said polyethylene material is a high density polyethylene material.

9. A molded part comprising a polymer plastic material, a portion of the molecules of which have a selected orientation along at least one direction, which orientation is thermally stable and has been maintained during a molding process.

10. A molded part in accordance with claim 9 wherein said selected material is a polymer plastic material comprising a first polymer plastic component the molecular chains of which are substantially oriented along a selected direction and a second polymer plastic component the molecular chains of which are substantially randomly oriented, said first and second polymer plastic components having interface regions therebetween in which said first and second polymer plastic components are substantially diffused with each other.

11. A molded part in accordance with claim 10 wherein said second polymer plastic component froms a matrix within which said first polymer plastic component is distributed.

12. A molded part in accordance with claim 11 wherein said polymer plastic material comprises a plurality of fibers, said first polymer plastic component having a plurality of cross-linked fibers and said second polymer plastic component having a plurality of non-cross-linked fibers.

13. A molded part in accordance with claim 12 wherein said polymer plastic material is a high density polyethylene material.

* * * * *